(12) United States Patent
Reddy et al.

(10) Patent No.: US 6,250,904 B1
(45) Date of Patent: Jun. 26, 2001

(54) CLOSED LOOP CONTROL OF ROLL SPEEDS IN PLASTIC SHEET EXTRUSION

(75) Inventors: Suresh Baddam Reddy, Erie, PA (US); John Arthur York, Evansville; Charles Ray Vickers, Mt. Vernon, both of IN (US); Donald Bruce Sorensen, Scotia, NY (US); Larry David Sarver, New Britain, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/253,709

(22) Filed: Feb. 22, 1999

(51) Int. Cl.[7] .................................................. B29C 47/92
(52) U.S. Cl. .......................................... 425/135; 425/367
(58) Field of Search ................................ 425/135, 140, 425/141, 145, 150, 169, 363, 367, 168; 264/40.7; 100/47

(56) References Cited

U.S. PATENT DOCUMENTS

| 4,011,976 | * | 3/1977 | Greer ........................................ 226/8 |
| 4,057,377 | * | 11/1977 | Sakurazawa .......................... 425/135 |
| 4,134,283 | * | 1/1979 | Noe ............................................ 72/8 |
| 4,247,507 | | 1/1981 | Katoh et al. ....................... 264/210.2 |
| 4,613,471 | | 9/1986 | Harris .................................... 425/140 |
| 4,880,371 | * | 11/1989 | Spinelli et al. ....................... 425/141 |
| 5,110,277 | * | 5/1992 | Hayashi ............................... 425/141 |
| 5,225,209 | * | 7/1993 | Hayashi ............................... 425/145 |
| 5,278,481 | * | 1/1994 | Danbury ............................... 318/685 |
| 5,433,897 | * | 7/1995 | Kanome et al. ..................... 425/367 |
| 5,577,283 | | 11/1996 | Badami et al. .......................... 8/158 |

FOREIGN PATENT DOCUMENTS

| 195 44 988 | 6/1997 | (DE) . |
| 0330321 | 8/1989 | (EP) . |
| 2039244 | 8/1980 | (GB) . |
| 9533970 | 12/1995 | (WO) . |

OTHER PUBLICATIONS

"Repetitive Control to Reduce Speed Ripple Caused by Strain Wave Gearing", by Ivan Godler et al., IEEE, 1994, pp. 1034–1038.

"Extrusion Techniques for Transparent Plastic Sheet Deivising for the Improvement of Appearance Mainly fon the Abatement of Gear Marks", by Dr. Yoshio Furuhashi et al., Technical Report, Supplement to Extruder News No. 2, Oct., 1984.

Japanese Patent Abstract—Tateishi Denki KK, JP 60 129614 A, Jul. 10, 1985.

International Search Report, No Date.

* cited by examiner

Primary Examiner—Robert Davis
Assistant Examiner—Thukhanh T. Nguyen
(74) Attorney, Agent, or Firm—Donald S. Ingraham; Douglas E. Stoner

(57) ABSTRACT

Closed loop control apparatus and methods for reducing ripples in an extruded plastic sheet include, for example, a closed loop speed control system having a roll speed sensor, a roll speed controller, and a roll drive. The roll speed sensor is communicatively coupled to the active extruder roll and configured to determine an actual roll speed of the active extruder roll. The roll speed controller is communicatively coupled to the roll speed sensor and utilizes the actual roll speed and desired roll speed to generate a command signal and transmit such signal to the roll drive. The roll drive is communicatively coupled between the roll speed controller and the active extruder roll, and utilizes the command signal to drive the active extruder roll, through its controllers and power electronics.

13 Claims, 6 Drawing Sheets

CLOSED LOOP CONTROL OF ROLL SPEEDS IN PLASTIC SHEET EXTRUSION

BACKGROUND OF THE INVENTION

This invention relates generally to plastic extrusion systems and, more particularly, to reducing gear marks and ripples on plastic sheet extruded with such systems.

In at least one known plastic extrusion system, plastic resin is extruded through a screw extruder to form a plastic sheet. The extruded plastic sheet is pulled by a pull roll and drawn under pressure between a first nip roll and a second nip roll. The nip rolls and the pull roll, also referred to herein as the active rolls, are independently driven by separate motors (DC electric motors are commonly used) via two-stage worm gear transmissions.

Roll speed fluctuations between the rolls typically cause ripples, or gear marks, to appear on an extruded plastic sheet. These ripples and gear marks diminish the optical quality of the sheet. Other factors that may cause ripples in the sheet include differences in the nip force between the rolls, the bearings, and type and the amount of lubricants. Ripples also are caused by differences in sheet flow rates at the nip rolls and the pull roll, differences in roll speeds, and differences in the plastic densities, e.g., due to temperature differences between hot nip rolls and cold pull rolls.

More specifically, the motors drive, or rotate, the active rolls at different speeds. For example, the first nip roll is driven at a surface speed slightly faster than the surface speed of the second nip roll to facilitate polishing one surface of the extruded sheet. The pull roll is driven at a surface speed even slightly slower than the second nip roll surface speed because the cooled plastic sheet has a higher density then the heated sheet drawn through the first and second nip rolls. The motor speeds typically are well regulated to facilitate rotating each roll at a desired speed.

Despite regulating the motor speeds, the active rolls for plastic sheet extruders sometimes experience speed fluctuations. These speed fluctuations typically are caused by gear transmission errors between the respective motors and rolls. For example, worm gear tooth profile errors, manufacturing errors, and deflections under load prevent a smooth transmission of power between the worm teeth and the worm threads in each two-stage worm gear transmission. As a result, there is a fluctuation in the normal and tangential forces at the transmission mesh, and the roll speeds, or surface speeds, fluctuate.

To reduce gear marks on plastic sheets, precise worm gearing in connection with the motors is sometimes used. However, worm gear tooth profile errors exist even with precise worm gearing. Therefore, although improving the precision of worm gearing may reduce the occurrence of gear marks, transmission errors still occur. These transmission errors also cause ripples on an extruded plastic sheet.

Other known apparatus for reducing gear marks include planetary gearing, fluid contact type transmission elements, and roller contact transmissions. These apparatus are directed at reducing, or eliminating, inherent transmission errors to reduce or eliminate ripples.

It would be desirable to improve the quality and reduce gear marks and other ripples in extruded plastic sheet. It also would be desirable to provide such improved quality even when transmission errors occur during extrusion.

SUMMARY OF THE INVENTION

An extrusion system for extruding plastic sheet includes a closed loop speed control system communicatively coupled to at least one active extruder roll. The closed loop speed control system typically comprises a roll speed sensor, a roll speed controller, and a roll drive. The roll speed sensor is communicatively coupled to the active extruder roll and configured to determine an actual roll speed of the active extruder roll. The roll speed controller is communicatively coupled to the roll speed sensor and utilizes the actual roll speed and desired roll speed to generate a command signal and transmit such signal to the roll drive.

DETAILED DESCRIPTION

The present invention provides an extrusion system for extruding plastic sheet that has a closed loop speed control system. Generally, closed loop systems of the type provided by present invention reduce speed fluctuations in the active extruder roll of the extruder, and thus reduce gear marks in extruded plastic sheet. Such systems typically also provide sheet product having improved image quality even when gear transmission errors occur.

Figure 1:
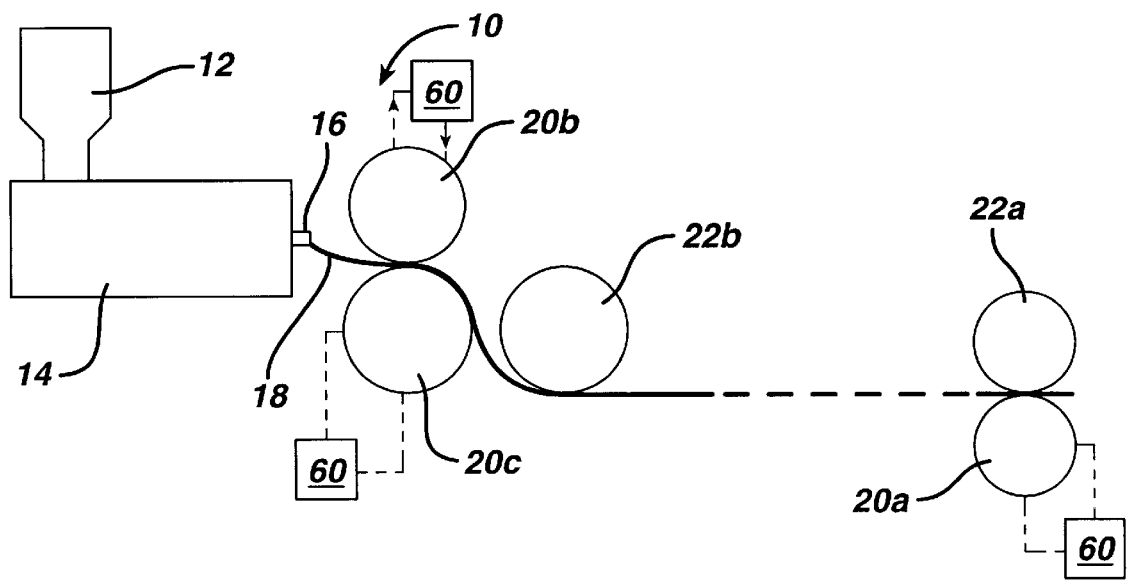
FIG. 1 is a schematic illustration of an extrusion system.

FIG. 1 is a schematic illustration of an extrusion system 10 including a hopper 12 and an extruder 14. Extrusion system 10 includes a die 16. A plastic resin is extruded through die 16 to form a plastic sheet 18. Extrusion system 10 further includes three active extruder rolls 20a, 20b, and 20c and idlers 22a and 22b. Plastic sheet 18 is pulled by active roll, or pull roll, 20a and is drawn under pressure between active roll, or first nip roll, 20b and active roll, or second nip roll, 20c, respectively. More particularly, active roll 20a pulls plastic sheet 18 between active rolls 20b and 20c, under idler 22b, and between active roll 20a and idler 22a.

Each active roll 20a, 20b, and 20c is driven by separate driving elements (not shown in FIG. 1) such as, for example, pulse width modulated (PWM) or silicon controlled rectifier (SCR) drives coupled to electric motors and worm gear transmissions (not shown in FIG. 1). To facilitate polishing extruded sheet 18, a first electric motor drives active roll 20b at a surface speed, or roll speed, slightly faster than a speed at which a second electric motor drives active roll 20c. A third electric motor drives active roll 20a at a surface speed slower than the surface speed of active roll 20c because extruded sheet 18 typically has a higher density when in contact with active roll 20a than when in contact with active rolls 20b and 20c. Active rolls 20b and 20c operate at temperatures between about 200° Fahrenheit and about 250° Fahrenheit, and are cooled by heat exchangers (not shown).

Figure 2:
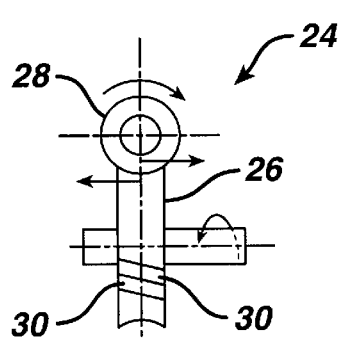
FIG. 2 is a front view of a worm gear transmission.
Figure 3:
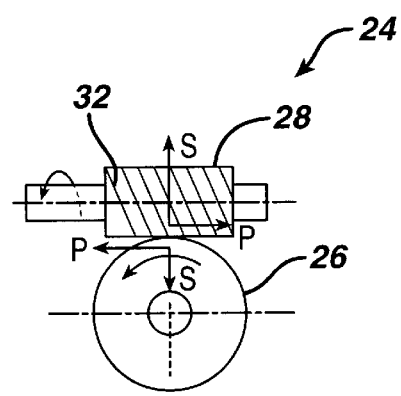
FIG. 3 is a side view of the worm gear transmission shown in FIG. 2.

FIG. 2 and FIG. 3 are front and side views, respectively, of a worm gear transmission 24 utilized in driving any one of active rolls 20a, 20b and 20c. Worm gear transmission 24 includes a worm wheel 26 and a threaded shaft 28. Worm wheel 26 includes several worm wheel teeth 30 that are configured to mesh with thread 32 of threaded shaft 28.

Worm gear transmission 24 sometimes fails to provide a smooth transmission of power between, for example, the first electric motor and active roll 20a. Accordingly, even when the first electric motor is regulated to drive active roll 20a at a constant speed, the roll speed of active roll 20a sometimes fluctuates. Similarly, the roll speeds of active rolls 20b and 20c fluctuate even when the second and third electric motors, respectively, are regulated to drive active rolls 20b and 20c at constant roll speeds. Such roll speed fluctuation, as described above, is undesirable and typically causes ripples, or gear marks, to be visible in extruded plastic sheet 18.

More specifically, and referring to worm gear transmission 24, worm wheel 26 typically includes a tooth profile error which may be caused, for example, by manufacturing errors or by deflections of worm wheel teeth 30 while operating under a load. Accordingly, tangential and normal forces between each one of teeth 30 and thread 32 vary from the instant such tooth 30 engages worm thread 32 until the instant such tooth 30 disengages from thread 32. Because this is repeated for every tooth 30, there is a fluctuation in transmitted torque and speed that corresponds to the gear meshing frequency (worm wheel 26 speed×number of teeth 30=input speed) and its harmonics. Variations between individual ones of teeth 30 are reflected by lower frequency fluctuations that correspond to the worm wheel speed and harmonics. For active rolls 20a, 20b, and 20c, which utilize two-stage worm gear transmissions, ripples typically occur on extruded sheet 18 at both a secondary gear meshing frequency and a primary gear meshing frequency.

In accordance with one embodiment of the present invention, roll speed is maintained substantially constant despite tooth profile error in worm wheel 26 and other gear transmission errors. As used herein, "substantially constant" refers to a roll speed fluctuation that has a standard deviation of about 1% or less in the frequency band for which the controller is tuned. It has been found that common motor controllers can control motor speed reasonably well (providing standard deviation of speed of about 0.3%), the worm gear transmission errors commonly result in much higher roll speed deviations, e.g. having a standard deviation of about 1.75% or greater. The present system provides a control system that addresses the speed fluctuations introduced by the transmission errors in addition to the motor speed variations, and provides substantially constant roll speeds. For example, a controller tuned at a 10 rad/sec bandwidth provided a reduced roll speed fluctuation having a standard deviation of about 0.97%.

Each active roll 20a, 20b, and 20c is operated in connection with a respective closed loop speed control system 60. Each closed loop speed control system analyzes the actual roll speed of one of active rolls 20a, 20b, and 20c, respectively, and drives the corresponding DC motor to maintain the roll speed substantially constant. The following discussion specifically describes various embodiments of closed loop control systems in connection with respect to exemplary active roll 20a; similar systems are typically implemented with active roll 20b and active roll 20c.

Figure 4:
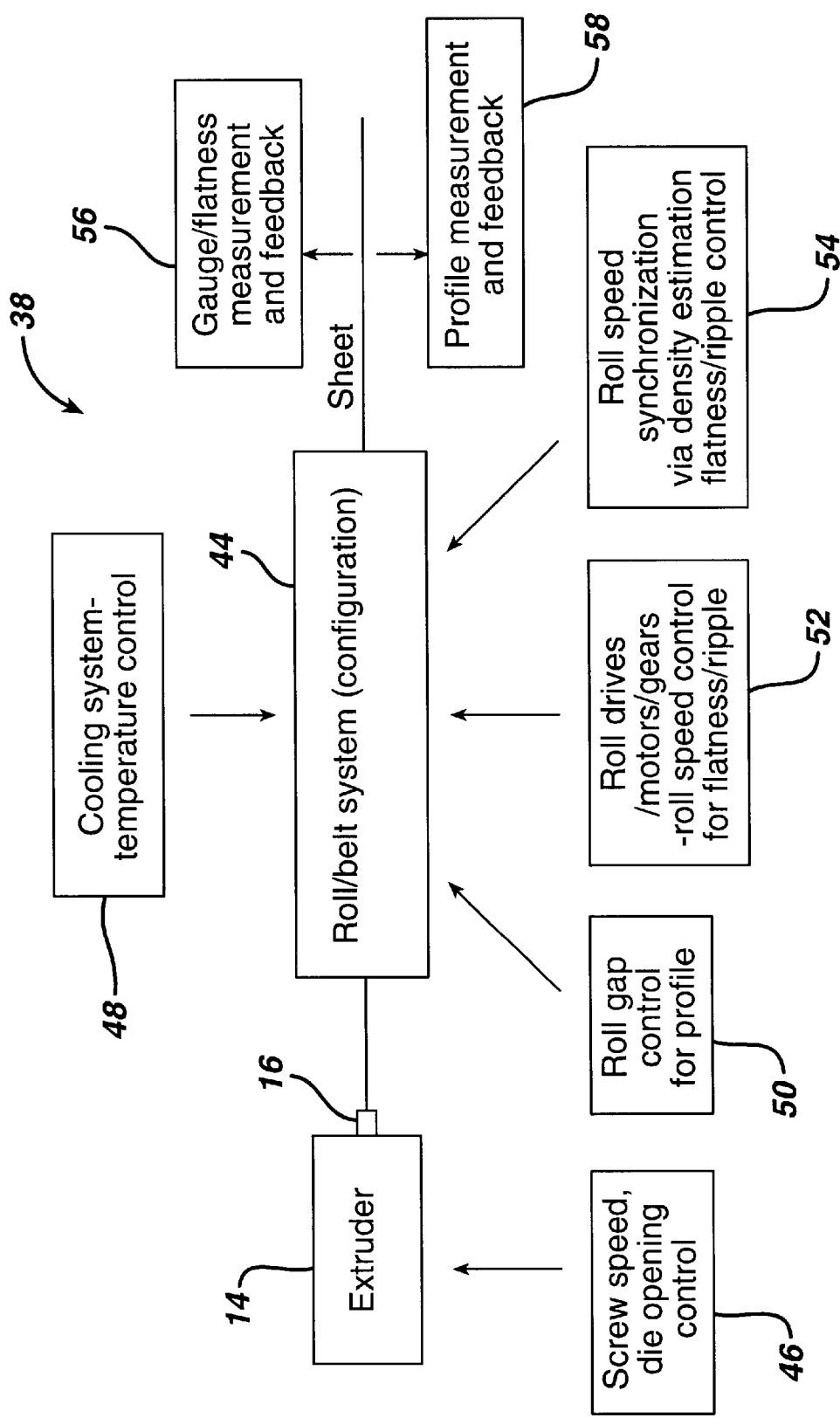
FIG. 4 is a schematic block diagram illustration of an extruder system.

FIG. 4 is a schematic block diagram illustration of an extruder system 38. System 38 includes extruder 14 having die 16 at its output. A roll-belt system 44 is positioned in series with extruder 14 for receiving and processing output from extruder 14. Extruder 14 is controlled by a screw speed and die opening control 46. Roll-belt system 44 is controlled by, for example, a cooling system temperature control 48, a roll gap control 50, roll drive control 52, and roll speed synchronization control 54. Various feedback units, such as a gauge and flatness measurement unit 56 and a profile measurement unit 58 are utilized to measure characteristics of the sheet output by system 44 and signals representative of the measured characteristics are utilized by the various controls to further improve operation of system 38. Additional details regarding the various controls are provided below. Again, the general objective of the control system is to reduce speed fluctuations in the active extruder rolls, and thus reduce gear marks in the extruded plastic sheet.

Figure 5:
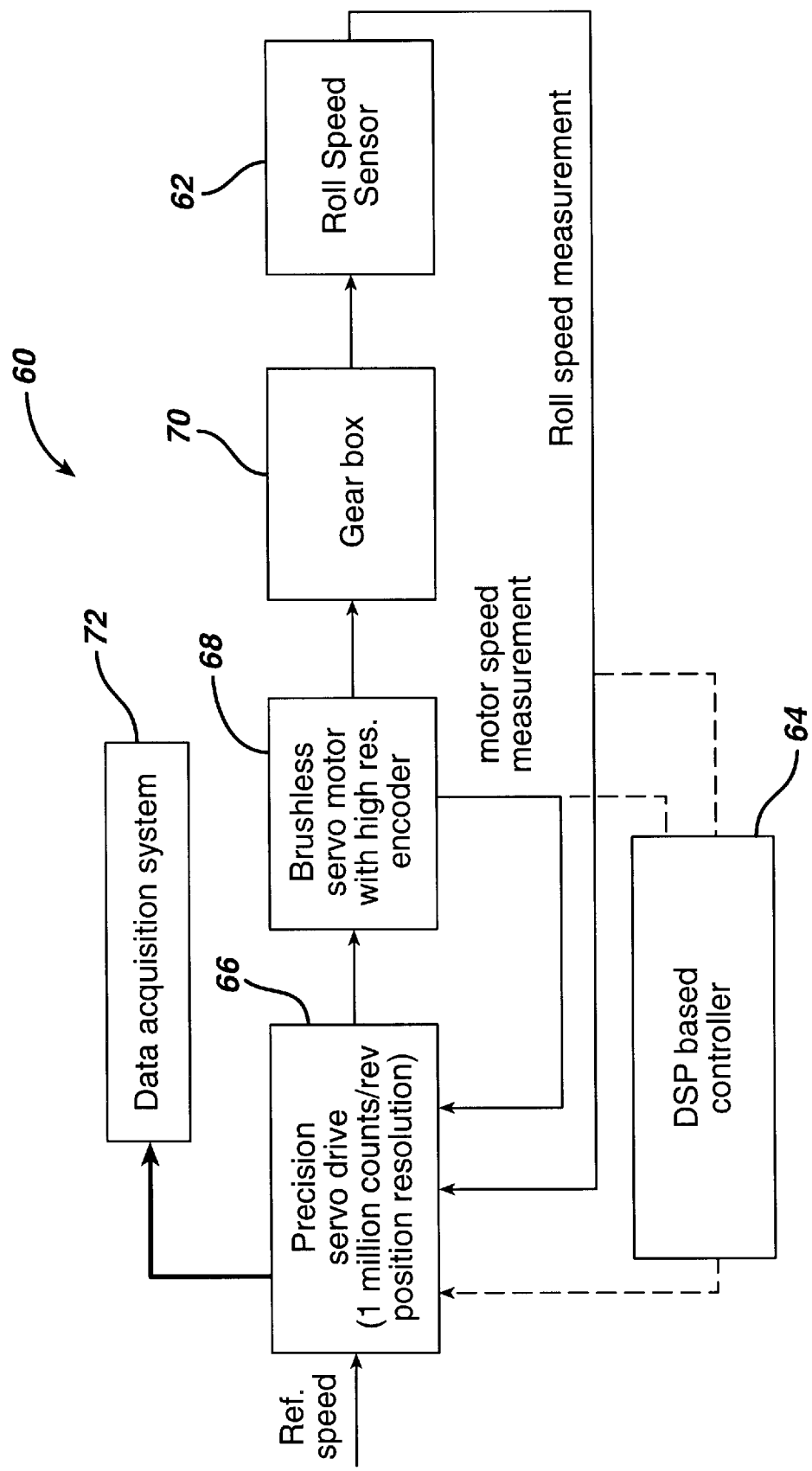
FIG. 5 is a schematic block diagram of a closed loop control system coupled to an active extruder roll in accordance with one embodiment of the present invention.

FIG. 5 is a schematic illustration of a closed loop control system 60 coupled to an active extruder roll in accordance with one embodiment of the present invention. Closed loop control system 60 comprises a speed sensor 62, a speed controller 64 and a speed drive 66. Speed sensor 62 includes a high resolution encoder secured to the active roll and configured to determine an actual roll speed of the roll. Speed sensor 62 may include a shielded high resolution encoder having an encoder disk concentrically positioned with respect to the active roll, or the encoder shaft may be coupled to the active roll with a precision transmission. Alternatively, speed sensor 62 may include a cylinder, as further described below, concentrically coupled to a shaft of the active extruder roll and a laser configured to project a laser beam to the cylinder.

Roll speed controller 64 is communicatively coupled to roll speed sensor 62 and is configured to transmit a speed command signal to speed drive 66. "Communicatively coupled" as used herein refers to a coupling between components to enable delivery of a signal or means to influence the components coupled; such coupling may be, for example electrical, mechanical, optical, or the like. Controller 64 may, for example, include a digital signal processor (DSP) and be configured to perform advanced control schemes. Roll speed controller 64 utilizes the actual roll speed and a set speed, e.g., a desired roll speed, to generate the speed command signal. Particularly, roll speed controller 64 compares the actual roll speed to the desired roll speed, and this speed error signal is used to modify the current command signal for roll drive 66. Roll drive 66 may be a precision servo drive that, for example, has a resolution of 1 million counts per revolution of the active roll; in this arrangement roll speed sensor 62 similarly has a high resolution of 1 million counts per revolution or higher.

Control system 60 maintains the roll speed of the active roll substantially constant even when transmission errors occur, i.e., closed loop control system 60 overcomes, or rejects, periodic fluctuations in roll speed. As described above, two-stage worm gear transmissions typically cause roll speed fluctuations to occur at both secondary and primary gear meshing frequencies and their harmonics. To reduce such fluctuations, control system 60 is designed for a bandwidth extending beyond the secondary gear meshing frequency and its immediate harmonics. For example, control system 60 typically is designed by utilizing conventional loop shaping techniques and treating gear errors at gear meshing frequencies as disturbances. The resulting compensator approximates a linear Pi or a higher order compensator. Alternatively, closed loop control system 60 may be designed by treating gear errors as periodic disturbances and utilizing an internal model or repetitive control to reject disturbances of known periods or frequencies. In one configuration, system 60 is configured to reject disturbances at primary and secondary gear meshing frequencies and their harmonics.

Utilizing the internal model principle, a step disturbance with zero steady state error is rejected, and an integrator (step's Laplace transform 1/s) is included in the control system. For zero steady state error with sinusoidal disturbance, its corresponding Laplace transform is incorporated in the control system. Similarly, to reject a periodic disturbance with zero steady state error, its corresponding Laplace transform ((1/(1−exp(−Ls)) where L is the temporal period of the disturbance) is incorporated in the control system. The internal model principle as applied to sinusoidal disturbances is known as a repetitive control system. For stability purposes, the control system is typically adjusted to result in a small reduction in steady state error performance for periodic disturbances.

Roll drive 66 is communicatively coupled between roll speed controller 64 and the active extruder roll, and is configured to utilize the current command signal to drive the active extruder roll to maintain a constant roll speed. Particularly, roll drive 66 is communicatively coupled between roll speed controller 64 and a motor 68 and a gear box 70 which drive the active extruder roll. Roll drive 66 maintains the motor current to the current command, by manipulating the voltage across terminals of motor 68 with its controllers and power electronics. Utilizing the speed error signal, roll speed controller 64 modifies, i.e., increases or decreases, the current command signal for roll drive 66, which in turn, modifies the voltage across the terminals of motor 68 to maintain the roll speed of the active extruder roll substantially constant, at the desired roll speed.

Electric motor 68 comprises, for example, a DC motor or brushless motor, or alternatively an AC induction motor. Gear box 70 may include transmission elements such as precision worm gears, planetary gears, spur gears having a helical bevel, a roller chain, a chain, or harmonic drive gears. Speed drive 66 may, for example, be a silicon controlled rectifier (SCR) type of drive or a pulse width modulated (PWM) type of drive. In addition, a data acquisition system 72 may be coupled to drive 66 to collect and store data relating to operation of system 60. Such data can be used, for example, to evaluate operation of the various controls.

Closed loop control system 60 is believed to substantially reduce speed fluctuations in the active roll, and thus substantially reduce any contribution by the active roll to the creation of gear marks on the extruded sheet.

As explained above, closed loop control systems identical to system 60 may be communicatively coupled to each active extruder roll 20a, 20b, and 20c. In one embodiment, speed set points, or desired speeds, for respective active extruder rolls 20b and 20c are independent from the set speed of active extruder roll 20a.

Implementing additional closed loop control systems 60 in connection with all the active rolls substantially reduces the appearance of gear marks on extruded plastic sheet, regardless of the occurrence of transmission errors in extrusion system 10. Accordingly, use of closed loop control systems 60 improves the optical quality of the extruded sheet (e.g., providing sheet that does not cause optical distortions and thus gives good image quality) even when gear transmission errors occur.

In accordance with another embodiment of the present invention, the speed set points for active extruder rolls 20a, 20b, and 20c are synchronized to reduce density fluctuations within sheet 18. Particularly, an actual temperature of sheet 18 adjacent active extruder roll 20a, and an actual temperature of sheet 18 adjacent active extruder rolls 20b and 20c are utilized to determine a density fluctuation in plastic sheet 18. The density fluctuation and set speeds of extruder rolls 20b and 20c, respectively, are then utilized to determine an appropriate set speed for active extruder roll 20a. Closed loop control system 60 communicatively coupled to active extruder roll 20a operates to drive extruder roll 20a at the appropriate setspeed.

Figure 6:
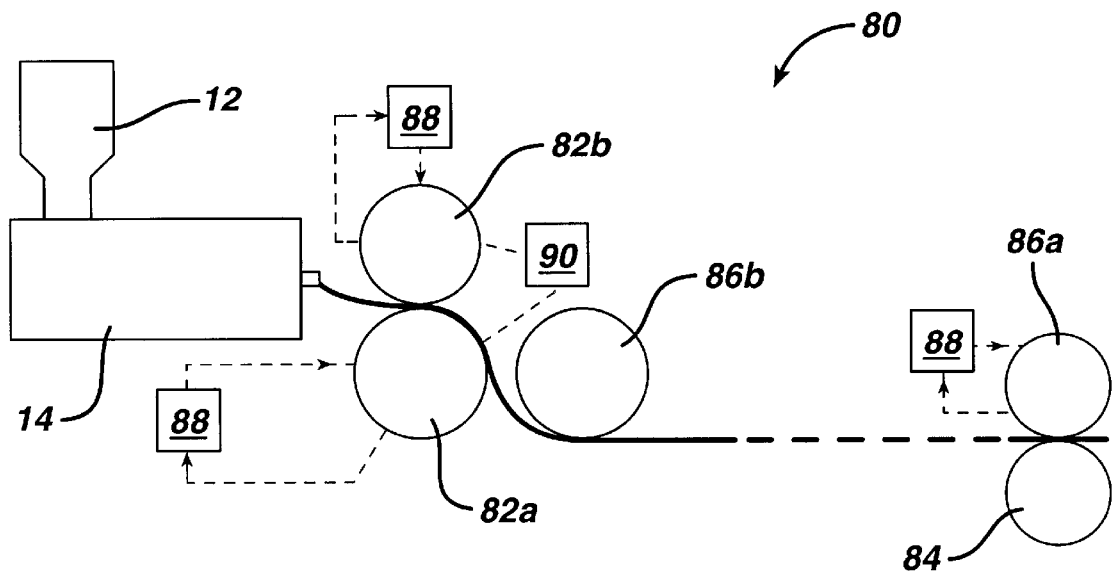
FIG. 6 is a schematic illustration of an extrusion system including three closed loop control systems and an automatic roll gap and measurement system in accordance with another embodiment of the present invention.

The above-described closed loop control system 60 may be utilized in connection with other methods of decreasing sheet ripples. For example, FIG. 6 is a schematic illustration of an extrusion system 80 including two active nip rolls 82a and 82b, respectively, an active pull roll 84, and two idler rolls 86a and 86b, respectively. One closed loop control system 88, such as closed loop control system 60, is communicatively coupled to each active roll 82a, 82b, and 84. In addition, an automatic roll gap control system 90 is communicatively coupled to active nip rolls 82a and 82b to regulate a nip force exerted between nip rolls 82a and 82b.

Figure 7:
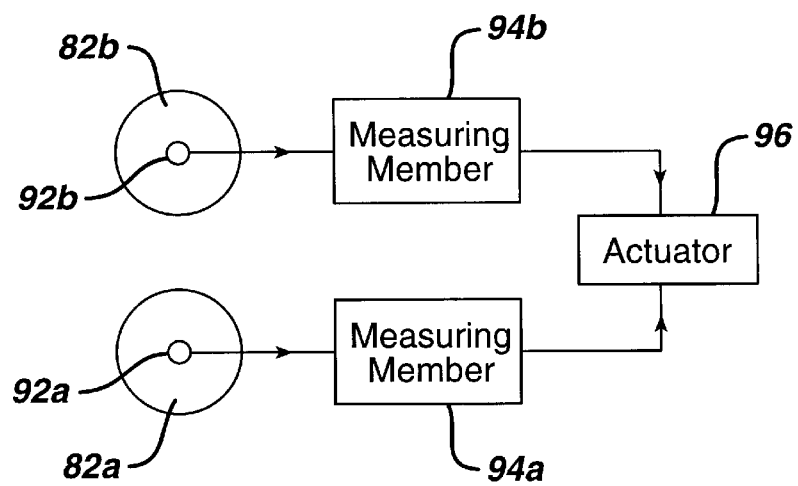
FIG. 7 is a schematic illustration of the automatic roll gap and measurement system and nip rolls shown in FIG. 6.

Particularly, active nip roll 82a includes a shaft 92a extending coaxially therethrough as illustrated in FIG. 7. Similarly, active nip roll 82b includes a shaft 92b extending coaxially therethrough. Automatic roll gap and measurement system 90 includes two measuring members 94a and 94b, and an actuator 96. Measuring member 94a is coupled to active nip roll 82a and measuring member 94b is coupled to active nip roll 82b. Measuring members 94a and 94b are configured to cooperate to determine vertical motion, e.g., the roll gap, of respective nip rolls 82a and 82b. Measuring member 94a may, for example, include a cylinder, a cam, a first laser, and a second laser. The cylinder and the cam are each concentrically coupled to nip roll shaft 92a. The first laser projects a laser beam to the cylinder, and the second laser projects a laser beam to the cam so that vertical displacement, as well as roll speed, of active nip roll 82a may be determined. Measuring member 94b is equivalent to measuring member 94a.

Actuator 96 is configured to receive signals corresponding to the roll gap from measuring members 94a and 94b and utilize such signals to manipulate the nip force between active nip roll 82a and active nip roll 82b and thus control the roll gap. Actuator 96 may, for example, be a motor or a hydraulic actuator.

Control system 90 thus measures the roll gap, and manipulates the force between rolls 82a and 82b, through an appropriate actuator, to maintain the roll gap to a desired set point. Roll gap control system 90 not only enables sheet gauge (thickness) control but also reduces the ripples arising from roll gap variations due to roll eccentricities, vertical force fluctuations from gear mesh and bearings. Automatic roll gap control system 90 cooperates with closed loop control systems 88 to reduce speed fluctuations in active rolls 82a, 82b and 84, respectively, and to reduce the likelihood of ripples.

Figure 8A:
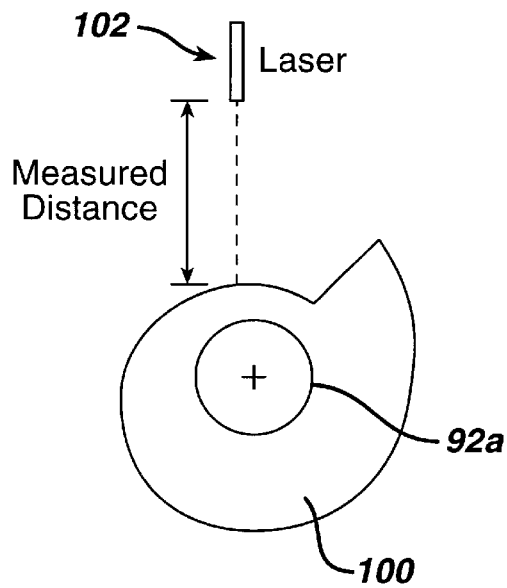
FIGS. 8A, 8B, and 8C illustrate a cam and laser arrangement, including a timing diagram, for measuring roll speed.
Figure 8B:
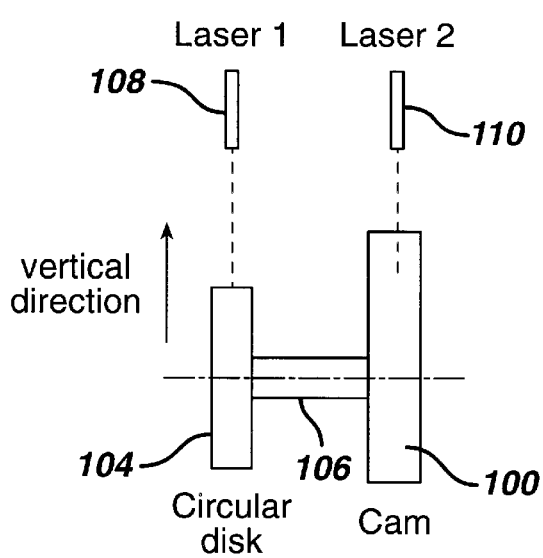
Figure 8C:
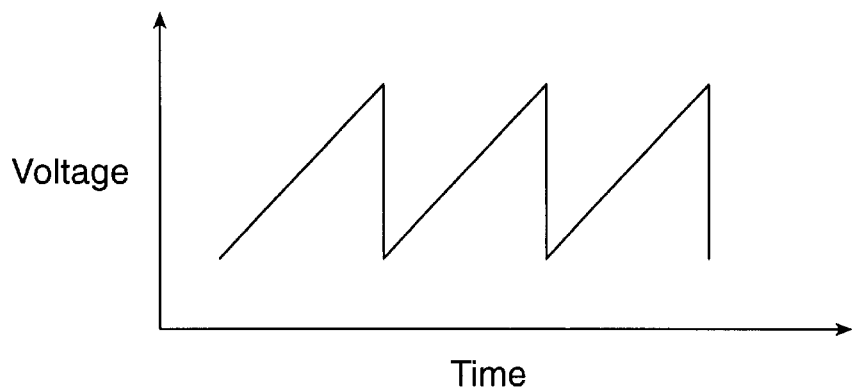

FIGS. 8A and 8B illustrate a cam 100 and laser 102 arrangement, and FIG. 8C illustrates a timing diagram, for measuring roll speed. As shown in FIGS. 8A and 8B, cam 100 and a circular shaped disk 104 are coupled by a cylinder, or a shaft, 106 and are secured to one of the active nip rolls. Cam 100, disk 104, and cylinder 106 are concentric with respect to the roll shaft. A first laser unit 108, comprising a laser and a detector directs a beam towards circular disk 104 and a second laser unit 110 directs a beam towards cam 100. The reflected beams from disk 104 and cam 100 are sensed. Unit 108 generates a signal representative of only vertical motion, and unit 110 generates a signal representative of both speed variation and vertical motion.

Of course, many variations to the cam and disk structure described above are possible. For example, rather than circular shaped disk 104, first laser unit 108 may simply be aligned with cylinder 106. Since cylinder 106 is concentric with respect to the roll shaft, the reflected beam back from cylinder 106 would be representative of vertical motion of the roller.

FIG. 8C is an exemplary signal generated by laser unit 110 with a uniform speed and no vertical motion being sensed. As the cam speed increases or decreases, the frequency of the signal, or the elapsed time between signal peaks, changes. Also, if the roll has any vertical motion, the peak voltage magnitude may vary.

Figure 9:
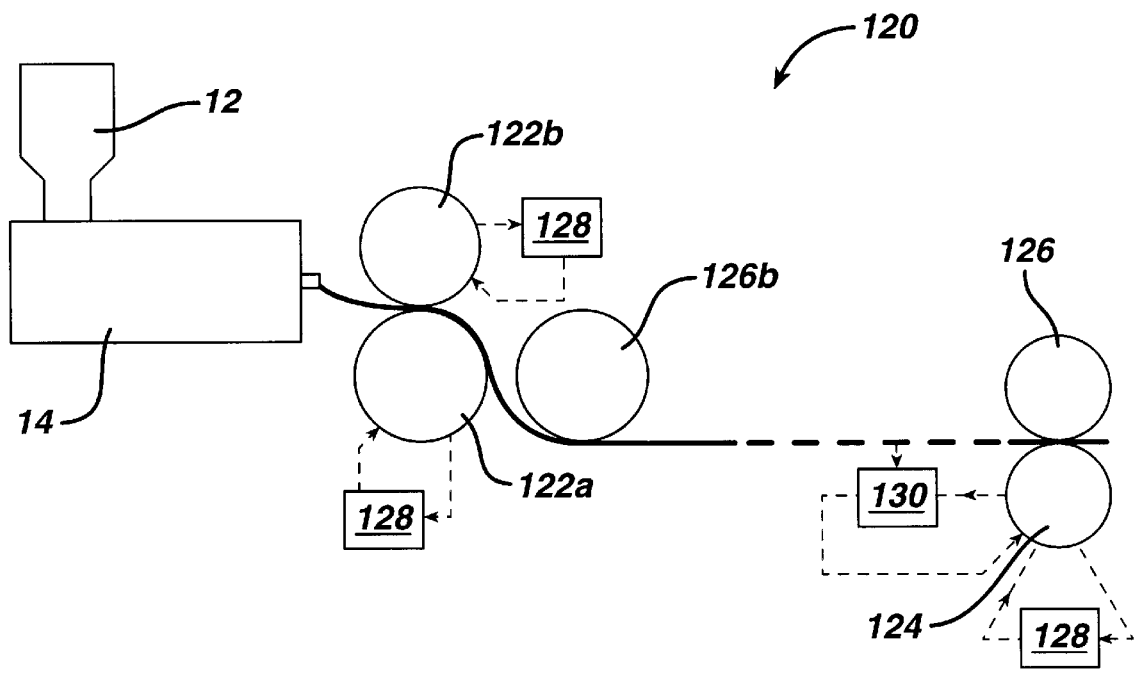
FIG. 9 is a schematic illustration of an extrusion system including three closed loop control systems and a ripple sheet measurement and control system in accordance with yet another embodiment of the present invention.

Closed loop systems 60 may also be implemented in connection with still other methods and apparatus for decreasing sheet ripples. For example, closed loop systems 60 may be utilized in connection with sheet ripple control systems. FIG. 9 is a schematic illustration of an extrusion system 120 including two active nip rolls 122a and 122b, respectively, an active pull roll 124, and two idler rolls 126a and 126b, respectively. One closed loop control system 128, such as closed loop control system 60, is coupled to each active roll 122a, 122b, and 124. In addition, a sheet ripple measurement and control system 130 is coupled to active roll 124. Additional sheet ripple measurement and control systems 130 may be communicatively coupled to active rolls 122a and 122b, respectively.

Figure 10:
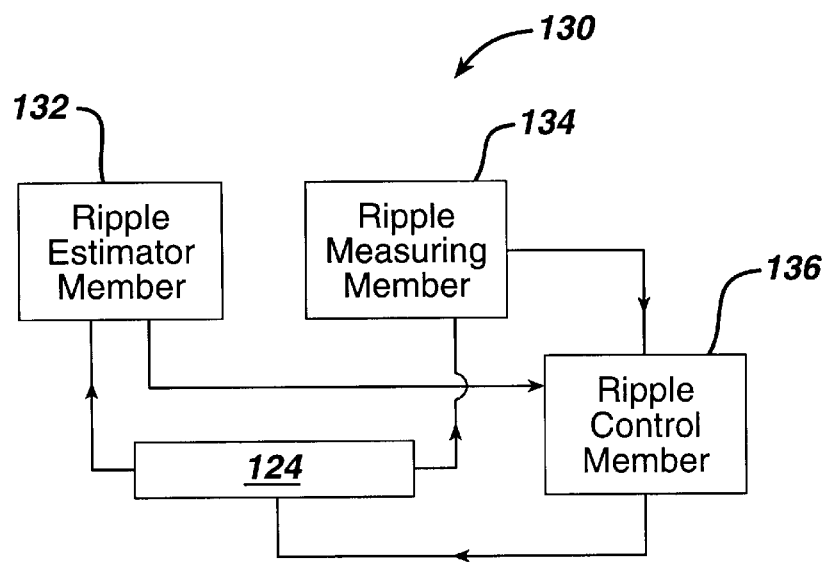
FIG. 10 is a schematic illustration of the ripple sheet measurement and control system shown in FIG. 9.

Referring now to FIG. 10, sheet ripple measurement and control system 130 includes a ripple estimator member 132, a ripple measuring member 134, and a ripple control member 136. Ripple estimator member 132 is communicatively coupled to active roll 124 and is configured to estimate sheet ripple utilizing an actual active roll speed, which may be determined, for example, by a roll speed sensor such as roll speed sensor 62. Ripple estimator member 132 may include, for example, a computer configured to apply differential equations to the actual active roll speed to determine the estimated sheet ripple. Ripple measuring member 134 is configured to measure actual ripples in an extruded sheet and to determine a ripple intensity and dominant frequency. Ripple measuring member 134 may include, for example, a video camera configured to generate videos of the extruded sheet and communicatively coupled to a frame grabber board and a computer configured to analyze ripple intensity and dominant frequency. Ripple control member 136 utilizes the estimated sheet ripple and the actual ripple intensity and dominant frequency to control the roll speed of active extruder roll 124. The actual sheet ripple measurement is used to improve and update the estimate model of the ripple estimator member, while the ripple estimator is continually used in the speed control system.

The above described extruder systems and methods substantially reduce speed fluctuations in the active rolls, e.g., the pull roll and the nip rolls, and thus substantially reduce any contribution of such rolls to the creation of gear marks on extruded sheets. Moreover, such extrusion systems maintain the roll speed of the respective active rolls substantially constant even if transmission errors occur.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An extrusion system for extruding a sheet, said system comprising:
   at least one active extruder roll; and
   at least one closed loop control system coupled to said active extruder roll and configured to drive said active extruder roll at a substantially constant roll speed;
   said closed loop control system comprising:
      a respective roll speed sensor configured to determine an actual speed of said at least one active extruder roll;
      a respective roll speed controller coupled to said roll speed sensor; and
      a respective roll drive for receiving a control signal from said roll speed controller, said roll drive coupled to the respective active extruder roll to drive said active extruder roll speed in correspondence with said respective roll speed controller receiving the respective actual active roll speed sensed by said respective roll speed sensor;
   said speed sensor comprising:
      a cylinder concentrically coupled to a roll shaft coupled to said active extruder roll;
      a cam with a linearly increasing radius concentrically coupled to said roll shaft;
      a first laser configured to project a laser beam to said cylinder; and
      a second laser configured to project a laser beam to said cam.

2. An extrusion system in accordance with claim 1 wherein said extrusion system comprises at least two active extruder rolls, said closed loop control system further comprises a respective roll speed sensor for each of said active extruder rolls, said control system being coupled to each said active extruder rolls such that the speed of each of said active extruder rolls is adjusted in correspondence with the respective active roll speed of said active extruder roll sensed by said respective roll speed sensor.

3. An extrusion system in accordance with claim 1 wherein said speed sensor is a high resolution encoder.

4. An extrusion system in accordance with claim 1 wherein said closed loop control system comprises a motor for driving said active extruder, and a plurality of transmission elements, said transmission elements being coupled between said motor and said roll, each transmission element comprising one of a worm gear transmission, a planetary gear, a spur gear, a roller contact, and a chain.

5. An extrusion system in accordance with claim 1 where in said extruder system comprises three active extruder rolls, each of said active extruder roll being coupled to said closed loop control system, and wherein said roll speeds of said respective active extruder rolls are synchronized to maintain plastic mass flow rate substantially constant.

6. An extrusion system for extruding a sheet, said system comprising:
   at least one active extruder roll;
   at least one closed loop control system coupled to said active extruder roll and configured to drive said active extruder roll at a substantial constant roll speed; and
   nip rolls and a roll gap control system comprising a roll gap measurement sensor for measuring a gap between said nip rolls and an actuator for applying vertical force on said nip rolls;
said closed loop control system comprising:
- a respective roll speed sensor configured to determine an actual speed of said at least one active extruder roll;
- a respective roll speed controller coupled to said roll speed sensor;
- a respective roll drive for receiving a control signal from said roll speed controller, said roll drive coupled to the respective active extruder roll to drive said active extruder roll speed in correspondence with said respective roll speed controller receiving the respective actual active roll speed sensed by said respective roll speed sensor;
- said roll gap sensor comprising:
  - a cylinder concentrically coupled to said roll shaft;
  - a cam with linearly increasing radius concentrically coupled to said roll shaft;
  - a first laser configured to project a laser beam to said cylinder; and
  - a second laser configured to project a laser beam to said cam.

7. An extrusion system in accordance with claim 1 further comprising a sheet ripple measurement system communicatively coupled to said active extruder roll, said sheet ripple measurement system configured to determine the ripple intensities and frequencies with respect to the extruded sheet and configured to control a roll speed of said active extruder roll utilizing said ripple intensities and frequencies.

8. A closed loop control system for controlling roll speed variation caused by gearing imprecision in the drive of an active extruder roller of an extrusion system, said closed loop control system comprising:
- a roll speed sensor configured to determine an actual speed of the active extruder roll;
- a roll speed controller communicatively coupled to said roll speed sensor; and
- a roll drive for receiving a control signal from said roll speed controller, said roll drive coupled to the active extruder roll to drive said active extruder roll speed in correspondence with the roll speed controller receiving the actual active roll speed sensed by said respective roll speed sensor so that said active drive roll rotates at a substantially constant speed;
- said roll speed sensor comprising a cam with a linearly increasing radius concentrically coupled to the roll and a laser source configured to project a laser beam to said cam.

9. A closed loop control system in accordance with claim 8 wherein said roll speed sensor comprises a high resolution encoder.

10. A closed loop control system in accordance with claim 8, further comprising a motor for driving the active extruder roll.

11. A closed loop control system in accordance with claim 10 further comprising a plurality of transmission elements, said transmission elements coupled between said motor and the roll, each said transmission element being one of a worm gear transmission, a planetary gear, a spur gear, a roller contact, and a chain.

12. An extrusion system comprising:
- a roll gap control system for an extrusion system including at least two nip rolls, the rolls positioned to enable a plastic sheet to be extended between the rolls, said system comprising a roll gap measurement sensor for measuring a gap between said nip rolls and an actuator for applying vertical force on the nip rolls; and
- a closed loop control system coupled to an active extruder roll and configured to drive said active extruder roll at a substantially constant roll speed;
- said closed loop control system comprising:
  - a respective roll speed sensor configured to determine an actual speed of said at least one active extruder roll;
  - a respective roll speed controller coupled to said roll speed sensor; and
  - a respective roll drive for receiving a control signal from said roll speed controller, said roll drive coupled to the respective active extruder roll to drive said active extruder roll speed in correspondence with said respective roll speed controller receiving the respective actual active roll speed sensed by said respective roll speed sensor;
- said roll cap sensor comprising a cam with a linearly increasing radius concentrically coupled to said roll shaft and a first laser source configured to project a laser beam to said cam.

13. A roll gap control system in accordance with claim 12 wherein said roll gap sensor further comprises:
- a cylinder concentrically coupled to said roll shaft;
- a second laser source configured to project a laser beam to said cylinder.

* * * * *